United States Patent [19]

Takai et al.

[11] Patent Number: 5,204,197

[45] Date of Patent: Apr. 20, 1993

[54] SEPARATOR MATERIAL FOR STORAGE BATTERIES AND METHOD FOR MAKING THE SAME

[75] Inventors: Yousuke Takai, Hyogo; Toyohiko Sano, Himeji; Isao Ikkanzaka, Amagasaki, all of Japan

[73] Assignees: Daiwabo Create Co., Ltd., Osaka; Kanai Juyo Kogyo Co., Ltd., Itami, both of Japan

[21] Appl. No.: 673,910

[22] Filed: Mar. 25, 1991

[30] Foreign Application Priority Data

Mar. 26, 1990 [JP] Japan .................................... 2-78274
Jan. 12, 1991 [JP] Japan .................................... 3-13741

[51] Int. Cl.$^5$ .................... C08F 228/06; C08F 226/06
[52] U.S. Cl. .................................... 429/249; 429/250; 429/251
[58] Field of Search .................... 429/249, 250, 251

[56] References Cited

U.S. PATENT DOCUMENTS 3,998,871 12/1976 Carlson .................... 429/249
4,110,143 8/1978 Cogliano et al. .................... 429/250
4,384,032 5/1983 Tashiro et al. .................... 429/249

FOREIGN PATENT DOCUMENTS 0316916 5/1989 European Pat. Off. .
55-105960 8/1980 Japan .
57-141862 9/1982 Japan .
58-194254A 12/1983 Japan .
59-4402 1/1984 Japan .
2061812 5/1981 United Kingdom .

OTHER PUBLICATIONS

Chemical Abstract 100:211254 (1984).

Primary Examiner—Olik Chaudhuri
Assistant Examiner—M. Nuzzolillo
Attorney, Agent, or Firm—Fish & Richardson

[57] ABSTRACT

Conjugate fibers using, as a surface component, ethylene copolymer containing a unit represented by a formula —$CH_2$—$CH(COOH)$—, and using, as a core component, polypropylene or like polyolefin fibers, are used to obtain thermally bonded non-woven fabric sheet to the treated with concentrated sulfuric acid or the like. By so doing, it is possible to readily introduce sulfo groups to replace tertiary carbon and thus impart the fibers with hydrophilicity. By using thus sulfonated thermal bonded non-woven fabric sheet as alkaline storage battery separators, it is possible to maintain high discharge capacity retention.

7 Claims, 2 Drawing Sheets

SEPARATOR MATERIAL FOR STORAGE BATTERIES AND METHOD FOR MAKING THE SAME

BACKGROUND OF THE INVENTION

1. Field of the Invention

This invention relates to sulfonated conjugate fibers having a surface portion constituted by a specific ethylene copolymer and a core portion constituted by polypropylene, a non-woven fabric sheet obtainable from such conjugate fibers, a storage battery separator using such non-woven fabric sheet and a method of manufacturing such battery separator.

2. Description of the Prior Art

Polyolefin fibers are chemically stable fibers and extensively utilized as non-woven fabric sheets and the like. When forming a non-woven fabric sheet, integrity is improved usually with the use of low melting point components having excellent thermal bonding properties. More specifically, core-sheath conjugate fibers are used, which consist of a core portion constituted by polypropylene and a sheath portion constituted by polyethylene or like low melting point compounds. Such conjugate fibers, however, are usually poorly hydrophilic, thus posing limitations on their use as storage battery separators and like purposes.

For example, as an alkali battery separator there have been proposed a polyolefin non-woven fabric sheet obtained by carrying out a surface active agent treatment to enhance the hydrophilicity and a non-woven fabric sheet mainly consisting of polyamide fibers having superior hydrophilicity although the oxidization resistance is inferior, these examples of a non-woven fabric sheet being disclosed in Japanese unexamined patent application laid open (Tokkai) No. 147956/1983, 194255/1983 and 39362/1986.

Non-woven fabric sheets used for alkali storage battery separators are required to have resistance against alkali, i.e., strongly alkaline electrolytes, and also resistance against oxidization, i.e., electrolytic oxygen generated during charging. In addition, it has to have a high specific volume sufficient to maintain permeation of and wetting by electrolysis. Further, it has to have sufficient shape stability to be free from interelectrode short-circuit that results from dielectric breakdown stemming from denaturing, shrinkage or dissolution caused during use and to also have adequate mechanical strength for assembling operations.

Polyamide fibers which are extensively used up to date for non-woven fabric sheet for storage battery separators have neither sufficient alkali resistance nor sufficient oxidization resistance, and also their shape stability is unsatisfactory.

Accordingly, there have been attempts to subject polyolefin fibers to surface active agent treatment before use. In this case, however, with charging and discharging carried out a number of times the surface active agent is reduced. This means that the hydrophilicity is gradually deteriorated.

To solve the above problems, it has been intended to use ethylene-vinylalcohol copolymer fibers as disclosed in Japanese unexamined patent application laid open (Tokkai) No. 34849/1988 or use polyethylene or polypropylene fibers after sulfonization as disclosed in Japanese unexamined patent application laid open (Tokkai) No. 175256/1983, 57568/1989, 132043/1989 and 132044/1989 and EpC 0316916 A2 (1989/05/24).

According to those prior arts as noted above, however, polyolefin is subjected to graft-copolymerization with acrylic acid or the like using radioactive rays, and the resultant copolymer is sulfonated with fuming sulfuric acid or the like. This means that hydrogen substitution reaction of tertiary carbon is involved. The reaction efficiency of this reaction is inferior and poses problems in the process of manufacture. In addition, introduction of sulfo groups can not be effected efficiently, and it is difficult to control the reaction factor.

Further, according to the EPC Disclosure 0316916A2 as noted above acrylic acid copolymerized polyethylene is pulverized after sulfonization, and resultant particles are bonded by adhesive to the surface of polypropylene fibers, thus presenting the problem of ready detachment of the bonded particles from the surface.

SUMMARY OF THE INVENTION

The present invention is intended to solve the above problems inherent in those prior arts, and it seeks to provide sulfonated conjugate fibers using a ethylene copolymer having a specific structure capable of efficient sulfo group introduction with concentrated sulfuric acid as well for a surface portion and polyolefin for a core portion, a non-woven fabric sheet using such sulfonated conjugate fibers, a storage battery separator using such non-woven fabric sheet and a method of manufacturing such battery separator.

Namely, the present invention relates to a separator material which is useful as a separator for storage batteries and which comprises a woven or non-woven fabric sheet made of fibers of a sulfonated conjugate fibers comprising at least first and second components thermally bonded together, said first component occupying a surface layer, said second component occupying a core portion, said first component being constituted by an olefinic random copolymer containing at least a unit represented as $-CH_2-C(SO_3H)-(COOH)-$, said second component being constituted by polyolefin having a melting point no higher than 250° C.

Additionally, the present invention relates to a method for making a separator material which is useful as a separator for storage batteries comprising a step of thermally pressing a fiber web composed of 30% or more by weight of core-sheath type conjugate fibers of thermally bonding type comprising a surface portion constituted by an ethylene copolymer composed of 0.5 to 25% by weight of an ethylenecarbonic monomer containing 0.5 to 25% by weight of an ethylenecarbonic acid of acrylic acid and/or maleic acid having a melting point $Tm_1.C$ of $70 < Tm_1 < 130$ and 0 to 24.5 by weight of acrylic acid ester and 99.5 to 75% by weight of ethylene and an inner portion constituted by a polyolefin having a melting point $Tm_2.C$ of $Tm_1 + 20 < Tm_2 < 250$ and other polyolefinic fibers by passing said fiber web through a pair of thermal press rollers constituted by flat rollers, thereby forming a non-woven fabric sheet through thermal bonding of the constituent fibers caused by melting of the surface portion of said core-sheath type conjugate fibers, and a subsequent step of sulfonizing said non-woven fabric sheet by dipping said non-woven fabric sheet in a concentrated sulfuric acid bath heated to 50 to 90° C., thereby introducing sulfo groups into tertiary carbon atom locations of the ethylene copolymer of the surface portion, to replace the carboxylic groups.

BRIEF DESCRIPTION OF THE DRAWINGS

FIG. 2 is a view showing an infrared absorption spectrum of a non-woven fabric sheet before treatment with concentrated sulfuric acid in Example 2.

FIG. 3 is a view showing an infrared absorption spectrum of an alkali battery separator after treatment with concentrated sulfuric acid in Example 2.

DETAILED DESCRIPTION OF THE INVENTION

Figure 1:
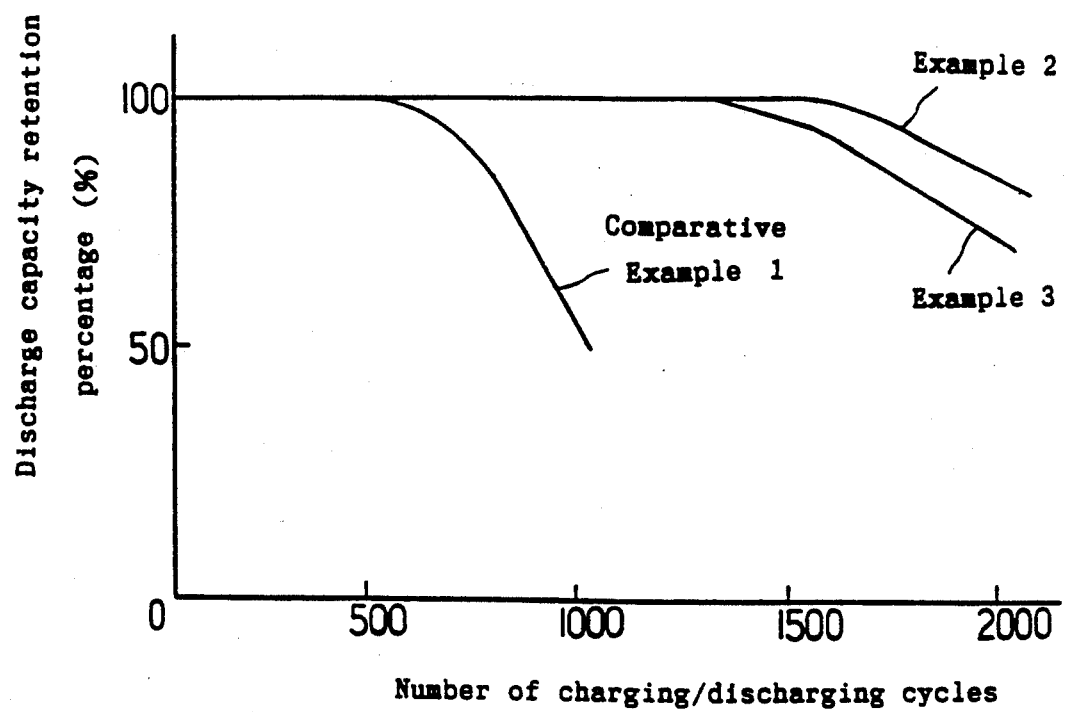
FIG. 1 is a graph showing relation between discharge capacity retention and a number of charging/discharging cycles.
Figure 1:
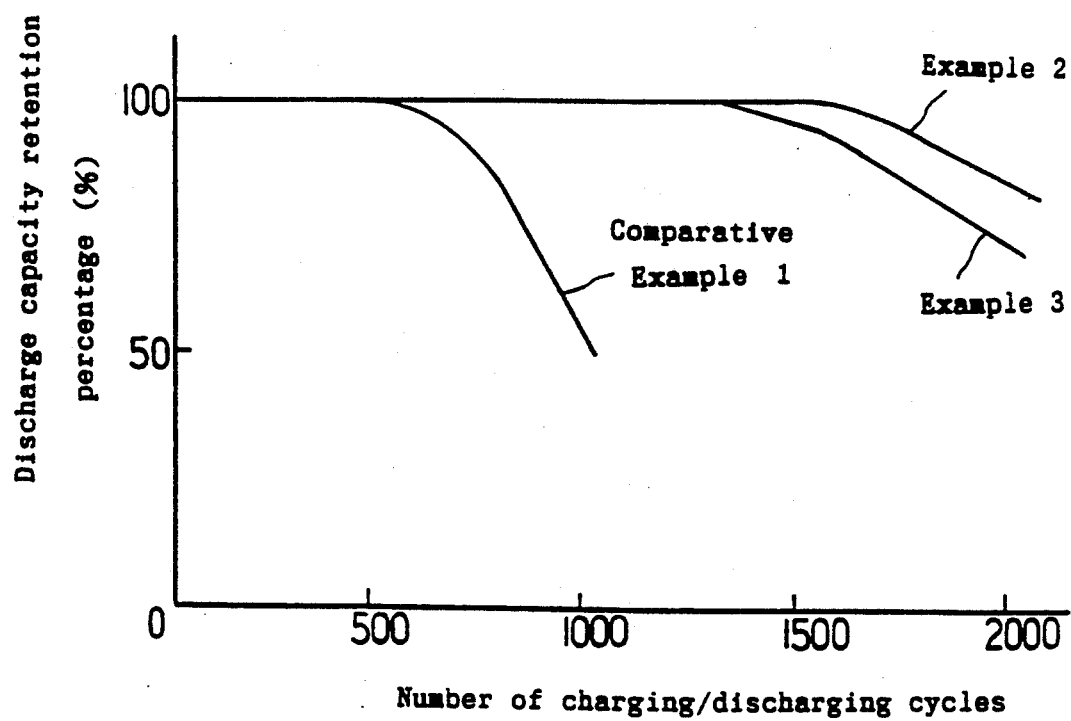

To attain the above object of the invention, there is provided sulfonated conjugate fibers comprising at least first and second components thermally bonded together, the first component occupying a surface layer, the second component occupying a core portion, the first component being constituted by an olefinic random copolymer containing at least a unit represented as —$CH_2$—$C(SO_3H)(COOH)$—, the second component being constituted by polyolefin having a melting point no higher than 250° C.

In the sulfonated conjugate fibers noted above, the first component is suitably an ethylene copolymer composed of an 0.5 to 25% by weight of an ethylenecarbonic acid monomer containing 0.5 to 25% by weight of an ethylenecarbonic acid of acrylic acid and/or maleic acid and 0 to 24.5% by weight of an acrylic acid ester and 99.5 to 75% by weight of ethylene, and the second component is suitably composed of polyolefin having a melting point no higher than 250° C., the first component occupying 30% or more of the fiber surface.

According to the invention, there is also provided a non-woven fabric sheet comprising a mixture of 30% or more by weight of conjugate fibers according to claim 1 or 2 and other polyolefin fibers the first component of the conjugate fibers being a thermal bonding component.

According to the invention, there is further provided a battery separator consisting of a non-woven fabric sheet composed of a mixture of 30% or more by weight of the sulfonated conjugate fibers noted above and other polyolefinic fibers, the first component of the conjugate fibers being a thermal bonding component.

In the battery separator noted above, ethylelencarbonic acid provided by addition with sulfo groups of the first component suitably occupies 0.4 to 4 mole % of the first component.

The battery separator noted above suitably consists of core-sheath type conjugate fibers with sheath and core components constituted by the first and second components, respectively.

According to the invention, there are further provided conjugate fibers of thermally bonding type comprising a precursor comprising a first component occupying a surface layer and having a comparatively low melting point and a second component occupying a core portion and having a comparatively high melting point, the first component being constituted by an ethylene copolymer containing at least a unit represented by the formula —$CH_2$—$CH(COOR)$—, where COOR represents a carboxylic group or an ester group, the second component being constituted by a polyolefin having a melting point not higher than 250° C.

According to the invention, there is yet further provided a method of manufacturing a battery separator comprising a step of thermally pressing a fiber web composed of 30% or more by weight of core-sheath type conjugate fibers of thermally bonding type comprising a surface portion constituted by an ethylene copolymer composed of 0.5 to 25% by weight of an ethylenecarbonic monomer containing 0.5 to 25% by weight of an ethylenecarbonic acid of acrylic acid and/or maleic acid having a melting point $Tm_1.C$ of $70 < Tm_1 < 130$ and 0 to 24.5% by weight of an acrylic acid ester and 99.5 to 75% by weight of ethylene and an inner portion constituted by polyolefin having a melting point $Tm_2.C$ of $Tm_1 + 20 < Tm_2 < 250$ and other polyolefinic fibers by pressing the fiber web through a pair of thermal press rollers constituted by flat rollers, thereby forming non-woven fabric sheet through thermal bonding of the constituent fibers caused by melting of the surface portion of the core-sheath type conjugate fibers, and a subsequent step of sulfonizing the nonwoven cloth by dipping the non-woven fabric sheet in a concentrated sulfuric acid bath heated to 50 to 90° C., thereby introducing sulfo groups into the tertiary carbon atom location of the ethylene copolymer of the surface portion to replace the carboxylic groups.

The sulfonated conjugate fibers according to the invention, comprising at least a first component occupying a surface portion and a second component occupying a core portion, can be used to obtain a non-woven fabric sheet or the like which has an excellent bonding property. This is so because the first component precursor which contributes to bonding is present in a great amount in the surface layer of the fibers. In addition, since the first component is constituted by an olefinic random copolymer containing a unit represented as —$CH_2$—$C(SO_3H)(COOH)$—, it is possible to have sulfo groups ($SO_3H$) be present accurately in a desired amount and consequently provide hydrophilicity. Examples of the olefinic random copolymers are ethylene, propylene and copolymers thereof.

With the suitable constitution of the sulfonated conjugate fibers according to the invention that the first component is an ethylene copolymer composed of 0.5 to 25% by weight of an ethylenecarbonic acid monomer containing 0.5 to 25% by weight of an ethylenecarbonic acid of acrylic acid and/or maleic acid and 0 to 24.5% by weight of an acrylic acid ester and 99.5 to 75% by weight of ethylene and that the second component is composed of polyolefin having a melting point no higher than 250° C., the first component occupying 30% or more of the fiber surface, superior adhesion and sulfo group introduction properties can be obtained.

With the constitution of the non-woven fabric sheet according to the invention consisting of a mixture of 30% or more by weight of the sulfonated conjugate fibers and other polyolefin fibers, the first component of the conjugate fibers being a thermal bonding component, it is possible to obtain a non-woven fabric sheet of a desired bonding state irrespective of whether the non-woven fabric sheet is partly or perfectly formed.

With the constitution of the battery separator according to the invention consisting of a non-woven fabric sheet composed of a mixture of 30% or more by weight of the sulfonated conjugate fibers and other polyolefinic fibers, the first component of the conjugate fibers being a thermal bonding component, it is possible to provide hydrophilicity suitable for particularly alkali storage battery separators.

With the preferred constitution of the storage battery separator according to the invention that ethylenecarbonic acid provided by addition with sulfo groups of the first component occupies 0.4 to 4 mole % of the first component, it is possible to provide hydrophilicity to more suitable alkali storage battery separators.

With the preferred constitution of the storage battery separator according to the invention consisting of core-sheath type conjugate fibers with sheath and core components constituted by the first and second components, respectively, the hydrophilic first component is present in a portion in contact with electrolyte as battery constituent, more suitable hydrophilicity can be provided to alkali storage battery separators.

Further with use, as a first component of the precursor constituting the conjugate fibers of thermally bonding type according to the invention, of a polymer component constituted by an ethylene copolymer containing a unit represented as —$CH_2$—$CH(COOR)$—, where COOR represents a carboxylic group or an ester group, the conjugate fibers may be readily sulfonated under a comparatively mild condition using sulfuric acid or the like after formation of a non-woven fabric sheet.

With the method of manufacturing a battery separator according to the invention, it is possible to manufacture storage battery separators logically.

As has been described in the foregoing, the conjugate fibers before sulfonization according to the invention, when used as thermally bonding fibers for non-woven fabric sheet, can be satisfactorily thermally bonded to polyolefin fibers.

In addition, they are capable of sulfo group introduction to obtain a thermally bonded non-woven fabric sheet, which has excellent hydrophilicity and can be suitably used for alkali storage battery separators.

Further, the storage battery separator according to the invention has an excellent moisture absorption property and can long maintain affinity with electrolyte and enhance liquid retention. Besides, it is excellent in alkali resistance and oxidization resistance and thus has a long life and can greatly improve the battery life.

Furthermore, according to the invention it is possible to very easily carry out the sulfonization treatment for enhancing the affinity to electrolyte and thus provide battery separators having a stable quality.

Further, with core-sheath type thermal bonding conjugate fibers, in which a precursor of first component is constituted by an ethylene copolymer and a second component is constituted by polyolefin, at the time of non-woven fabric sheet formation the fibers after drying are fixed by thermal fusion of the low melting ethylene copolymer, and after formation of the non-woven fabric sheet the ethylene copolymer exhibits very excellent affinity to electrolytes and moisture absorption properties owing to sulfo groups introduced to tertiary carbon atom locations, to which carboxyl groups have been bonded, and remaining carboxyl groups.

DESCRIPTION OF THE PREFERRED EMBODIMENTS

The invention concerns sulfonated conjugate fibers, a non-woven fabric sheet formed therefrom, an alkali battery using such nonwoven fabric sheet and a method of manufacturing such battery separator. It is predicated in a finding that copolymerization of a unit represented by a formula —$CH_2$—$CH(COOH)$— with ethylene permits ready sulfonization of tertiary carbon bonded to carbonic acid. Sulfonated polyethylene copolymer fibers have both chemical stability and hydrophilicity and can solve problems inherent in materials used for prior art battery separators. Thus, they permit development of the conjugate fibers, the non-woven fabric sheet thereof and the storage battery separator obtained through sulfonization of the non-woven fabric sheet according to the invention.

Ethylene copolymers containing a unit represented as —$CH_2$—$CH(COOH)$— of the first component precursor of the sulfonated conjugate fibers according to the invention has as low melting point as below about 130° C., while having a strong self-bonding property. The conjugate fibers according to the invention, which have 30% by weight more of the first component precursor on their surface are advantageous as thermal bonding fibers for non-woven fabric sheet. If the content of ethylenecarbonic acid monomer in the first component precursor is above about 25% by weight, fusion between polymer pellets and fibers is pronounced thus leading to a cause of troubles in yarn-spinning processes. If the content is below 1% by weight, on the other hand, the factor of sulfonization of the non-woven fabric sheet as will be described later is insufficient.

The first component precursor containing ethylenecarbonic acid monomer in the above range readily undergoes a decomposition reaction at a temperature of 260° C. or above if its melting point $Tm_1$.C is $70 < Tm_1 < 130$. The second component which is a support component of the conjugate fibers is suitably capable of spinning at a temperature no higher than 260° C., preferably no higher than 250° C.

When the first component precursor is made to be a thermal bonding component by fusion, the second component should be thermally stable. This requires that the melting point $Tm_2$ of the second component is higher than the melting point $Tm_1$° C. of the first component precursor by 20° C. or more.

The polyolefin of the second component is suitably a homopolymer or copolymer of polypropylene or a copolymer polymethyl of 1-pentene. It is possible to use as well high density polyethylene or a 1-polybutene copolymer having a melting point higher than the melting point of the first component precursor by 20° C. or more.

Since the conjugate fibers before sulfonization are used as thermal bonding fibers, 30% or more of their surface should be occupied by the first component precursor. Preferably, they should be of parallel type where 70% or more of their surface is occupied by the precursor or of sheath-core type where their surface is entirely occupied.

Such conjugate fibers according to the invention before sulfonization can be thermally treated either in situ or together with other fibers to obtain non-woven cloth. Such a nonwoven fabric sheet can be readily sulfonized by the first component precursor of the conjugate fibers.

More specifically, a side chain of the ethylene copolymer has a carboxyl group contained in the first component precursor, and a sulfo group is introduced into the tertiary carbon atom location of the main chain, to which the carboxyl group is bonded.

A sulfonization reaction is brought about by treating the nonwoven fabric sheet with fuming sulfuric acid, condensed sulfuric acid, sulfur trioxide gas, chlorosulfonic acid, etc. Using condensed sulfuric acid is suitable for sulfonization reaction factor control.

The non-woven fabric sheet obtained through sulfonization in the above way according to the invention is constituted by polyolefin fibers containing 30% or more of the conjugate fibers noted above, with the first component of the conjugate fibers being a thermal bonding component.

If the conjugate fibers are contained at least by 30%, sufficient adhesion to maintain the shape of the non-woven fabric sheet can be obtained. Other polyolefin fibers used with the conjugate fibers have a melting point equal to or higher than the melting point of the second component of conjugate fibers and may be polypropylene, methyl 1-pentene or a homopolymer or copolymer of high density polyethylene. The non-woven fabric sheet may be formed by forming the stable fibers in a usual way using a card or random waver into a web and thermal press rolling the web.

Alternatively, short cut fibers are processed in a papermaking process into a web, which is then thermally treated. The thermal bonding process is carried out at a temperature higher than the softening point of the first component precusor of the conjugate fibers before sulfonization but lower than the melting points of the second component and other polyolefin fibers.

The non-woven fabric sheet according to the invention is obtained in the above way as such or as paper, felt, cloth, etc., and it is imported with hydrophilicity through a sulfonization treatment. Using this non-woven fabric sheet an alkali storage battery separator, which is satisfactory in affinity with an alkali electrolyte, excellent in permeability, moisture absorption property, liquid-retaining capacity and durability and capable of providing stable battery performance for repeated charging and discharging for a long time.

The sulfo-group-added ethylenecarbonic acid that is contained in the first component of the conjugate fibers in the non-woven fabric sheet will cause gelation or dissolution of fibers in an alkaline liquid if its content in the first component exceeds 5 mol %. For this reason, the sulfonization degree is controlled depending on use. A suitable sulfonization degree is usually 0.4 to 4 mol % for battery separator purposes, 4 to 15 mol % for wet wiper purposes, and 4 to 20 mol % for ammonia deodorization and moisture absorption purposes.

Further, it is assumed that in the sulfonization treatment on the non-woven fabric sheet the electron density of tertiary carbon atoms (or asymmetric carbon atoms) in the main chain, to which carboxyl groups in the first component of conjugate fibers are bonded, is reduced by the induced reaction effect (or I-effect) of carboxyl groups having electron-attracting property, and the sulfo group substitution reactivity is increased compared to the case of sole polyethylene or polypropylene.

Therefore, a method using fuming sulfuric acid, which is hazardous and will lead to deterioration of operation environment as well as having poor process reproducibility, or a treatment with condensed sulfuric acid under a high temperature condition of 100° C. or above is unnecessary, and it was confirmed that it was possible to introduce sulfo groups quickly, efficiently and in a short period of time in a dipping treatment using concentrated sulfuric acid in a low temperature range of 50 to 90° C. This is practically and industrially important.

Further, a method of treatment is found, which can permit reaction in a low temperature range and therefore has a superior process control property as well as being free from damage to processing apparatus and deterioration of the mechanical strength of fibers, efficient and very excellent in reproducibility. Further, washing after sulfonization treatment is carried out using liquid free from alkali metal and like anions. Particularly, due care has to be paid when carrying out washing after sulfonization with the high degree of sulfonization.

Examples will now be given. It is not to be construed that these examples are limitative.

FIBER PRODUCTION EXAMPLES 1 TO 5

Conjugate fibers consisting of an ethylene copolymer as shown in Table 1 as a sheath component and polypropylene with a MFR (melt flow value) of 30 g/10 min. (at 230° C.) as a core component, with a sheath-to-core component ratio of 40 : 60, were obtained through fusion spinning at a spinning temperature of 260° C. The fibers thus obtained were extended to a couple of times their length in heated water at 60° C. The fibers were then given machine curing and then cut to a length of 51 mm. Some of these fibers were cut to a length of 5 mm without giving machine curing to obtain short cut fibers for paper making. The composition of the sheath portion and breakage strength and elongation of obtained fibers are shown in Table 1.

CONTRAST FIBER PRODUCTION EXAMPLES 4 to 5

Conjugate fibers were obtained by spinning in the same way as in Example 1 except for that the ethylene copolymer with a lower ethylene content, polyethylene and polypropylene were used for the sheath component in Fiber production example 1. The composition of the sheath component and breakage strength and elongation of the obtained fibers are shown in Table 1.

NON-WOVEN FABRIC SHEET PRODUCTION EXAMPLES 1 TO 6

The fibers obtained in Fiber production examples 1 and 4 were rendered to be a web using a roller card. Then, using a hot air penetration machine at 120° C. the sheath component was fused, and the fibers are thermally bonded together to obtain a non-woven fabric of 40 g/m$^2$. Also, short but fibers were used to make paper, which was dried at 110° C., thus obtaining paper of 20 g/m$^2$. The fiber proportions and strength of the non-woven fabric sheet and paper thus obtained are shown in Table 2.

CONTRAST NON-WOVEN FABRIC SHEET PRODUCTION EXAMPLES 4 AND 5

A non-woven fabric sheet consisting of 20 wt % of fibers in Fiber production example 4 and 80 wt % of fibers in Contrast fiber production example 3 was produced in the same way as in Example 1. Also, a non-woven fabric sheet and paper consisting of 100 wt % of fibers fiber production example 2 were produced. The strength of the obtained non-woven fabric sheet and paper is shown in Table 2.

TABLE 1

|  | Fiber production examples | | | | | Contrast fiber production examples | | |
| --- | --- | --- | --- | --- | --- | --- | --- | --- |
|  | 1 | 2 | 3 | 4 | 5 | 1 | 2 | 3 |
| Sheath component | | | | | | | | |
| Copolymer component concentration (wt %) | | | | | | | | |
| Acrylic acid | 4 | 4 | 7 | 22 | 5 | 30 | (*1) | |
| Methyl acrylate | — | — | — | — | 15 | — | — | |
| Ethylene | 96 | 96 | 93 | 78 | 80 | 70 | 100 | |
| Vicat softening point (°C.) | 85 | 85 | 84 | 50 | 56 | 45 | 120 | |
| Melting point (°C.) | 99 | 99 | 97 | 85 | 86 | 75 | 130 | 163 |
| Ml (190° C., 2169 g applied) g/10 min. | 14 | 14 | 14 | 300 | 10 | 300 | 15 | |
| Properties of fibers | | | | | | | | |
| Degree of fiber (D) | 2.0 | 3.0 | 3.1 | 3.2 | 3.2 | (*2) | 2.0 | 2.0 |
| Breakage strength (g/D) | 3.1 | 3.2 | 2.8 | 2.5 | 3.0 | | 2.5 | 6.5 |
| Elongation strength (%) | 40 | 45 | 50 | 60 | 50 | | 70 | 40 |

(Note) *1: Polypropylene was used.
*2: No fibers could be obtained due to fusion

TABLE 2

|  | Non-woven fabric sheet production examples | | | | | | Contrast production examples | |
| --- | --- | --- | --- | --- | --- | --- | --- | --- |
|  | 1 | 2 | 3 | 4 | 5 | 6 | 4 | 5 |
| Fiber proportion (wt %) | | | | | | | | |
| Fibers of Ex.1 | 100 | 50 | | | | | | |
| Fibers of Ex.4 | | | 100 | 50 | 50 | 30 | 20 | |
| Fibers of Contrast ex. 2 | | | | | 50 | | | 100 |
| Fibers of Contrast ex. 3 | | 50 | | 50 | | 70 | 80 | |
| Thermal bonding temperature (°C.) | 120 | 120 | 120 | 120 | 120 | 120 | 120 | 120 |
| Performance of non-woven fabric sheet | | | | | | | | |
| Breakage length (longitudinal) (Km) | 2.1 | 1.5 | 2.6 | 1.8 | 1.9 | 1.3 | 1.2 | Not bonded |
| Breakage length (transversal) (Km) | 0.8 | 0.6 | 1.1 | 0.7 | 0.7 | 0.5 | 0.3 | — Same as above |
| Performance of paper | | | | | | | | |
| Breakage length (longitudinal) (Km) | 1.9 | — | 2.1 | — | — | — | — | — Same as above |
| Breakage strength (transversal) (Km) | 1.2 | — | 1.5 | — | — | — | — | — Same as above |

The mechanical strength of the non-woven fabric sheet in the Non-woven fabric sheet production examples and Contrast non-woven fabric sheet production examples was measured as follows. A sample with a width of 50 mm and a grip length of 100 mm was pulled, and breakage strength (g) was measured at a speed of 300 mm/min.

The breakage length was calculated as follows.

Breakage length (Km) = Pull breakage strength (g) / 50 × weight (g/m$^2$

EXAMPLE 1

A non-woven fabric sheet as produced in example 1 was held dipped in fuming sulfuric acid at 25° C. for 10 minutes, then washed with water and then dried in a dryer at 60° C. for one hour. The resultant non-woven fabric sheet was dropped on a water surface to exhibit no water-repelling property but become instantly wholly wetted. At the same time, a non-woven fabric sheet of Non-woven fabric sheet production example 6 was dropped on a water surface. It showed pronounced water-repelling property over its entire surface. Its surface is not wetted even after a lapse of 10 minutes.

EXAMPLE 2

Blend fibers consisting of 2d × 51 mm, 70% by weight of core-sheath type conjugate fibers, which consisted of ethylene-acrylic acid copolymer resin (with the copolymerization ratio of acrylic acid being 3% by weight) for the sheath portion and polypropylene for the core portion (the melting point of copolymer resin for the sheath portion being 105° C.), and 1.5d × 38 mm, 30% by weight of regular polypropylene fibers were processed using a carder and a cross wrapper to obtain fiber agglomerate consisting of cross web, followed by thermal press using a pair of calender rollers heated to 120° C. to obtain a non-woven fabric sheet with a weight of 65 g/m$^2$ and a thickness of 0.2 mm.

This non-woven fabric sheet was then held dipped in 97 wt % concentrated sulfuric acid heated to 80° C. for 3 minutes, then dipped in diluted sulfuric acid and then washed with a great quantity of water. Then, it was subjected to a neutralization treatment using diluted ammonia water, then sufficiently washed and dried to obtain a non-woven fabric sheet storage battery separator according to the invention.

EXAMPLE 3

A fiber mat consisting of 2d × 51 mm, 50% by weight, of core-sheath conjugate fibers, which consisted of a ethylene-acrylic acid copolymer resin (with the copolymerization ratio of acrylic acid being 4% by weight) for the sheath portion and polypropylene for the core portion (with the melting point of copolymer resin for the sheath portion being 99° C.), and 1.5d × 38 mm, 50% by weight of regular polypropylene fibers was subjected to thermal press using a pair of calender rollers heated to 110° C. to obtain a non-woven fabric sheet with a weight of 65 g/m$^2$ and a thickness of 0.20 mm.

This non-woven fabric sheet was treated with sulfuric acid under the same conditions as in Example 2 to obtain a non-woven fabric sheet storage battery separator according to the invention.

EXAMPLE 4

The same thermal press non-woven cloth as in Example 3 was held dipped in 97 wt % condensed sulfuric acid at 50° C. for 5 minutes, then dipped in diluted sulfuric acid and then washed with a great quantity of water. Then it was subjected to a neutralization treatment with ammonia water, then sufficiently washed and then dried to obtain a non-woven fabric sheet storage battery separator according to the invention.

COMPARATIVE EXAMPLE 1

A fiber mat consisting of a blend web constituted by 2d ×51 mm, 50% by weight of core-sheath type conjugate fibers, which consisted of polypropylene for the core and polyethylene for the sheath, and 5d×38 mm, 50% by weight of regular polypropylene fibers, was subjected to thermal press using a pair of calender rollers at 130° C. to obtain a non-woven fabric sheet with a weight of 65 g/m$^2$ and a thickness of 0.20 mm.

This non-woven fabric sheet was then treated with sulfuric acid under the same conditions as in Example 1 to obtain a non-woven fabric sheet storage battery separator according to the invention.

COMPARATIVE EXAMPLE 2

A non-woven fabric sheet as obtained in comparative example 1 was held dipped in 97 wt % concentrated sulfuric acid at 110° C. Then, it was washed with water and then subjected to neutralization with diluted ammonia water, followed by washing with water and drying, thus obtaining a non-woven fabric sheet storage battery of the contrast example.

Various physical property tests were conducted on the battery separators obtained in the Examples and Comparative examples.

Results are shown in Table 3.

TABLE 3

| Test Item | Ex. 2 | Ex. 3 | Ex. 4 | Comparative ex. 1 | Comparative ex. 2 |
| --- | --- | --- | --- | --- | --- |
| Weight (g/m$^2$) | 68 | 68 | 68 | 65 | 67 |
| Thickness (mm) | 0.20 | 0.20 | 0.20 | 0.20 | 0.20 |
| Water content (wt %) | 0.79 | 0.75 | 0.85 | 0.03 | 0.17 |
| Liquid absorption speed (mm) | 52 | 47 | 45 | 0 | 32 |
| Liquid retention percentage (%) | 325 | 298 | 273 | 145 | 253 |
| Alkali resistance (%) | 0.3 | 0.2 | 0.2 | 0.2 | 0.5 |
| Oxidization resistance (%) | 0.1 | 0.1 | 0.1 | 0.1 | 0.2 |
| Mechanical strength retention percentage (%) after treatment with concentrated sulfuric acid | 92 | 95 | 98 | 95 | 73 |

In the table;

Liquid absorption speed: Level of absorption liquid when one end of battery separator sample 25 mm in width has been held dipped in caustic potash solution with a specific gravity of 1.30

Liquid retention percentage: Liquid absorption percentage after battery separator having been dipped in caustic potash solution with a specific gravity of 1.30 has been suspended for 10 minutes and drained Alkali resistance: Weight reduction percentage of battery separator after being held dipped in caustic potash solution with a specific gravity of 1.30 at 80° C.

Oxidization resistance: Weight reduction percentage of battery separator after being held dipped in a blend solution composed of 250 ml of 5 wt % KMnO, solution and 50 ml of a caustic potash solution with a specific gravity of 1.30 at 50° C. for one hour Mechanical strength retention percentage after treatment with concentrated sulfuric acid: Tensile strength retention percentage of battery separator before and after treatment with concentrated sulfuric acid Water content: After leaving batter separator under conditions of 20° C. and RH of 65% for 24 hours FIG. 1 shows results of battery performance tests conducted using the non-woven fabric sheet storage battery separators obtained in Examples 2 and 3 and Comparative example 1.

The graph shows the discharge capacity retention percentage of Ni-Cd storage battery with a capacity of 1,200 mA hr. when charging and discharging are repeatedly carried out under a charging condition of 400 mA ×4 hr. and a discharging condition of 1 Ω constant resistance discharge×2 hr. by assembling each battery separator noted above in the battery. The ordinate is taken for the discharge capacity retention percentage, and the abscissa for the number of charging/discharging cycles.

As is obvious from FIG. 1, the batteries using the storage battery separators according to the invention are subject to less discharge capacity reduction after repeated charging and discharging and can withstand long use owing to their excellent affinity to electrolyte and chemical resistance. However, the storage battery using the battery separator of Comparative example 1 is subject to discharge capacity reduction in a short period of time, which is thought to result from drying of the electrolyte.

Meanwhile, for confirming the effect of introduction of the functional group (SO$_3$H) by sulfonization, infrared absorption spectra were obtained with the non-woven fabric sheet before sulfonization and storage battery separator obtained thereafter in Example 2 using an infrared spectrophotometer (IR-408 by Shimazu Seisakusho). FIGS. 2 and 3 show these infrared spectra. In FIGS. 2 and 3, 1 is COOH group (or carboxyl group), 2 is SO$_3$H group (or sulfo group), and 3 is SO$_3$H group (or sulfo group). As is obvious from the physical property table of FIGS. 2 and 3, owing to the presence of the atom group of SO$_3$H the storage battery separators according to the invention exhibit excellent affinity to electrolyte without aid of any surface active agent and have satisfactorily liquid absorption and retention properties.

Further, the battery separator according to the invention is also satisfactory durable with respect to the alkali resistance and oxidization resistance, and further it is subject to less mechanical strength reduction in treatment with concentrated sulfuric acid. Thus, it can sufficiently withstand long use for repeated charging and discharging when it is assembled in a storage battery.

EXAMPLE 5

Conjugate fibers as obtained in Fiber production examples 1 and 4 were held dipped in 97 wt % concentrated sulfuric acid at 50 for 3 minutes and then dipped in diluted sulfuric acid, followed by washing with a great amount of water. Then, they were subjected to a neutralization treatment with diluted ammonia water, followed by sufficient washing and drying to obtain conjugate fibers according to the invention. The breakage strength and breakage elongation of the obtained fibers were measured. Table 4 shows the results.

TABLE 4

|  | Fibers of Fiber production example 1 | Fibers of Fiber production example 2 |
|---|---|---|
| Breakage strength (g/D) | 2.8 | 2.0 |
| Breakage elongation (%) | 32 | 48 |

Further, the conjugate fibers of Fiber production examples 2, 3, 5 and 6 and the non-woven fabric sheet of Non-woven fabric sheet production example 1 were subjected to treatment with sulfuric acid under the same conditions as in example 2. Like the case of example 2, ready sulfo group introduction into the sheath component could be obtained.

As has been shown, according to the invention by using an ethylene copolymer containing a unit represented by the formula $CH_2$—$CH(COOH)$— for a surface portion of the conjugate fibers and using polypropylene or like polyolefin fibers for the core portion of the fibers, ready sulfo group introduction can be obtained through a treatment with concentrated sulfuric acid or the like to obtain a copolymer containing a unit represented by the formula —$CH_2$—$C(SO_3H)$-$(COOH)$—, and thus impart the fibers with hydrophilicity. By using a thermal bonding non-woven fabric sheet obtained from the conjugate fibers as an alkali battery separator, it is possible to maintain a high discharge capacity percentage as shown in FIG. 1.

The sulfonated conjugate fibers according to the invention can be utilized extensively for woven fabrics, cloth, knit fabrics, filament fibers, spun yarns, melt-blow non-woven fabric sheet, paper, etc. as well as the non-woven fabric sheet noted above.

We claim:

1. A separator material for storage batteries comprising a fabric sheet made of fibers, said fibers comprising sulfonated conjugate fibers comprising at least first and second components thermally bonded together, said first component occupying a surface layer, said second component occupying a core portion, said first component comprising an olefinic random copolymer containing at least a unit represented as —$CH_2$—$C(SO_3H)(COOH)$—, and said second component comprising a nonsulfonated polyolefin having a melting point no higher than 250° C.

2. A separator material according to claim 1, wherein said first component is an ethylene copolymer composed of 0.5 to 25% by weight of ethylenecarbonic acid monomer containing 0.5 to 25% by weight of ethylene-carbonic acid of acrylic acid and/or maleic acid and 0 to 24.5% by weight of acrylic acid ester and 99.5 to 75% by weight of ethylene, and said second component is composed of polyolefin having a melting point no higher than 250° C., said first component occupying 30% or more of the fiber surface.

3. A separator material according to claim 1, wherein the fabric sheet is a non-woven fabric sheet comprising a mixture of 30% or more by wight of said fibers, the first component of said conjugate fibers being a thermal bonding component.

4. A battery separator material according to claim 2, wherein the ethylenecarbonic acid comprises 0.4 to 4 mol % of the ethylene copolymer.

5. A battery separator material according to claim 3 or 4, wherein the sulfonated conjugate fibers are core-sheath conjugate fibers with the sheath and core components representing the first and second components, respectively.

6. A separator material according to claim 1, wherein the sulfonated conjugate fibers are thermally bonding fibers consisting of a precursor comprising a first component occupying a surface layer and having a comparatively low melting point and a second component occupying a core portion and having a comparatively high melting point, said first component comprising an ethylene copolymer containing at least a unit represented by the formula —$CH_2$—$CH(COOH)$—, where COOR represents a carboxylic group or an ester group, said second component comprising a polyolefin having a melting point not higher than 250° C.

7. A separator material according to claim 1, wherein said first and second components are directly bonded to one another.

* * * * *

UNITED STATES PATENT AND TRADEMARK OFFICE
CERTIFICATE OF CORRECTION

PATENT NO. : 5,204,197
DATED : April 20, 1993
INVENTOR(S) : Yousuki Takai, et. al.

It is certified that error appears in the above-indentified patent and that said Letters Patent is hereby corrected as shown below:

In the Drawings:
Please add Figure 2 as follows:

1... COOH group (or carboxyl group)

2... $SO_3H$ group (or sulfo group)

3... $SO_2H$ group (or sulfo group)

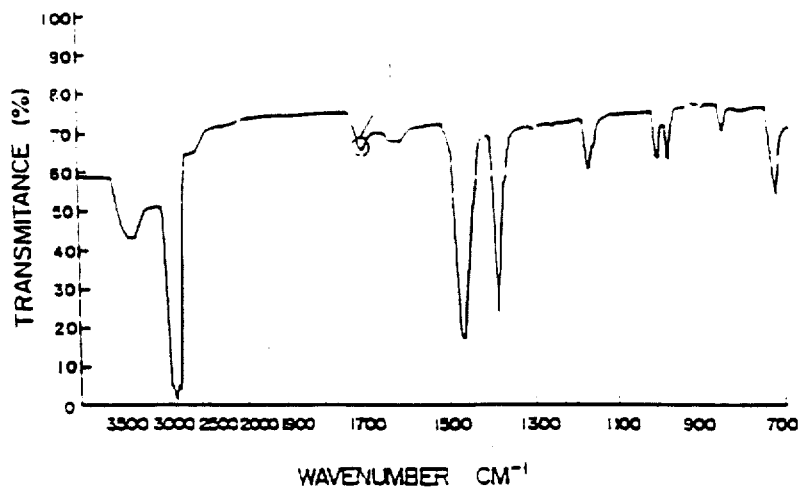

FIG. 2

UNITED STATES PATENT AND TRADEMARK OFFICE
CERTIFICATE OF CORRECTION

Page 2 of 2

PATENT NO. : 5,204,197
DATED     : April 20, 1993
INVENTOR(S) : Yousuki Takai, et. al.

It is certified that error appears in the above-indentified patent and that said Letters Patent is hereby corrected as shown below:

Please add Figure 3 as follows:

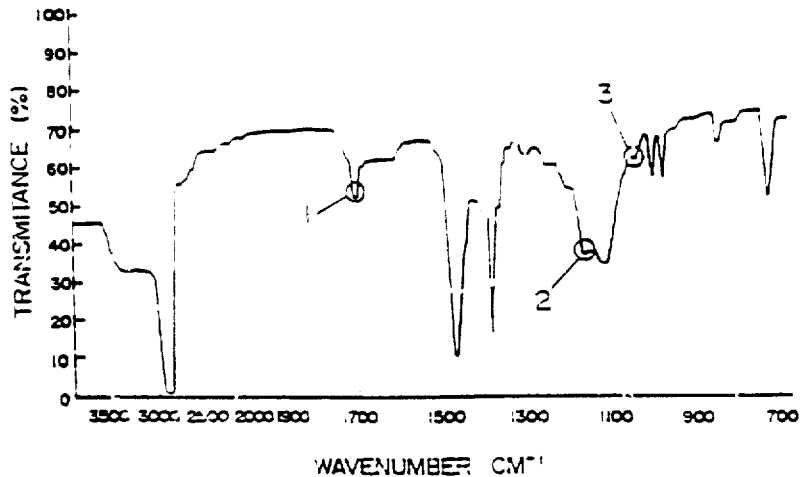

FIG. 3

Signed and Sealed this

Seventeenth Day of May, 1994

Attest:

BRUCE LEHMAN

Attesting Officer          Commissioner of Patents and Trademarks